(12) United States Patent
Peng et al.

(10) Patent No.: US 10,985,554 B2
(45) Date of Patent: Apr. 20, 2021

(54) EQUILIBRIUM-CONDUCTANCE-COMPENSATED ECCENTRIC METHOD FOR OBTAINING POWER TRANSFER COEFFICIENTS OF DIRECT CURRENT POWER NETWORKS

(71) Applicant: SHENZHEN UNIVERSITY, Guangdong (CN)

(72) Inventors: Jianchun Peng, Guangdong (CN); Hui Jiang, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 554 days.

(21) Appl. No.: 16/002,748

(22) Filed: Jun. 7, 2018

(65) Prior Publication Data
US 2018/0331535 A1 Nov. 15, 2018

Related U.S. Application Data

(63) Continuation of application No. PCT/CN2017/084283, filed on May 15, 2017.

(51) Int. Cl.
*H02J 1/00* (2006.01)
*G01R 21/00* (2006.01)
(Continued)

(52) U.S. Cl.
CPC ............ *H02J 1/00* (2013.01); *G01R 19/2513* (2013.01); *G01R 21/133* (2013.01); *G06F 17/16* (2013.01); *G06F 2119/06* (2020.01)

(58) Field of Classification Search
CPC .... H02J 1/00; H02J 1/14; G06F 17/16; G06F 2119/06; G01R 19/2513; G01R 21/133
See application file for complete search history.

(56) References Cited

U.S. PATENT DOCUMENTS

| 10,581,270 | B2 * | 3/2020 | Jiang .................. H02J 13/0003 |
| 2003/0139887 | A1 | 7/2003 | Fulczyk et al. |

(Continued)

FOREIGN PATENT DOCUMENTS

| CN | 102510107 A | 6/2012 |
| CN | 103956733 A | 7/2014 |
| CN | 104995810 A | 10/2015 |

OTHER PUBLICATIONS

International Search Report and Written Opinion issued in PCT/CN2017/084283, dated Jan. 15, 2018, 11 pages.

*Primary Examiner* — Son T Le
(74) *Attorney, Agent, or Firm* — Hamre, Schumann, Mueller & Larson, P.C.

(57) ABSTRACT

An equilibrium-conductance-compensated eccentric method for obtaining power transfer coefficients of a direct current (DC) power network, including: establishing an equilibrium-conductance-compensated globally-linear function that relates all bus translation voltages to a bus injection power according to given bus load parameters and given bus source parameters of the DC power network; establishing an equilibrium-conductance-compensated globally-linear eccentric matrix-equation model for steady state of the DC power network; establishing an equilibrium-conductance-compensated globally-linear eccentric matrix relation between non-reference bus injection powers and non-reference bus translation voltages by using ordinary inversion of matrices; establishing an equilibrium-conductance-compensated globally-linear eccentric expression of a branch-transferred power in terms of the non-reference bus injection powers; and obtaining power transfer coefficients of the DC power network according to the equilibrium-conductance-compensated globally-linear eccentric expression and the known definition of power transfer coefficient.

6 Claims, 2 Drawing Sheets

(51) Int. Cl.
*G01R 21/133* (2006.01)
*G01R 19/25* (2006.01)
*G06F 17/16* (2006.01)
*G06F 119/06* (2020.01)

(56) References Cited

U.S. PATENT DOCUMENTS

| | | | |
|---|---|---|---|
| 2013/0304266 A1* | 11/2013 | Giannakis | G01R 21/133 700/286 |
| 2016/0301209 A1* | 10/2016 | Peng | H02J 3/12 |
| 2016/0372922 A1* | 12/2016 | Peng | H02J 13/0003 |
| 2019/0074715 A1* | 3/2019 | Jiang | H02J 13/0003 |

* cited by examiner

EQUILIBRIUM-CONDUCTANCE-COMPENSATED ECCENTRIC METHOD FOR OBTAINING POWER TRANSFER COEFFICIENTS OF DIRECT CURRENT POWER NETWORKS

CROSS-REFERENCE TO RELATED APPLICATIONS

This application is a continuation of International Patent Application No. PCT/CN2017/084283 with an international filing date of May 15, 2017, designating the United States. The contents of the aforementioned application, including any intervening amendments thereto, are incorporated herein by reference.

TECHNICAL FIELD

The present application relates to electric power engineering field, and more particularly to an equilibrium-conductance-compensated eccentric method for obtaining power transfer coefficients of direct current (DC) power networks.

BACKGROUND

The DC power network is a new kind of electric energy transmission network. Using the branch security regulation experience of traditional alternating current (AC) power networks for reference, a set of power transfer coefficients of the DC power network is a necessary tool for regulating its branch securities. As a result, it is urgent to develop an accurate, fast and reliable method for obtaining the power transfer coefficients of DC power networks.

The globally-linear method for obtaining power transfer coefficients of AC power networks is produced by assuming all bus voltage amplitude to be 1.0 p.u. and voltage angle difference across each branch close to zero, and then simplifying the AC power network steady-state model. The bus voltage in the DC power network is just characterized by amplitude (without angle), if assuming that all bus voltage amplitudes are 1.0 p.u., then each branch-transferred power will always be zero, consequently no globally-linear method for obtaining power transfer coefficients of DC power networks can be produced following the above AC power network method. If linearizing the steady-state model of the DC power network at its operation base point to obtain its power transfer coefficients, then the resultant local linear features will lead to being unable to satisfy the accuracy requirement of the branch security regulation under wide range change of the operation point of the DC power network. As a result, there is currently no globally-linear method for obtaining the power transfer coefficients of the DC power network.

SUMMARY

An Embodiment of the present application provides an equilibrium-conductance-compensated eccentric method for obtaining the power transfer coefficients of the DC power network, thus the power transfer coefficients of the DC power network can be obtained in a globally linear way.

The present application provides an equilibrium-conductance-compensated eccentric method for obtaining power transfer coefficients of a DC power network, which comprises:

establishing an equilibrium-conductance-compensated globally-linear function that relates all bus translation voltages to a bus injection power according to given bus load parameters and given bus source parameters of the DC power network;

establishing an equilibrium-conductance-compensated globally-linear eccentric matrix-equation model for steady state of the DC power network according to the equilibrium-conductance-compensated globally-linear function and a given reference bus serial number;

establishing an equilibrium-conductance-compensated globally-linear eccentric matrix relation between non-reference bus injection powers and non-reference bus translation voltages by using ordinary inversion of matrices according to the equilibrium-conductance-compensated globally-linear eccentric matrix-equation model;

establishing an equilibrium-conductance-compensated globally-linear eccentric expression of a branch-transferred power in terms of the non-reference bus injection powers according to the equilibrium-conductance-compensated globally-linear eccentric matrix relation; and obtaining power transfer coefficients of the DC power network according to the equilibrium-conductance-compensated globally-linear eccentric expression and the known definition of power transfer coefficient.

According to an embodiment of the present application, the equilibrium-conductance-compensated globally-linear function that relates all the bus translation voltages to the bus injection power is firstly established according to the given bus load parameters and the given bus source parameters of the DC power network; the equilibrium-conductance-compensated globally-linear eccentric matrix-equation model for the steady state of the DC power network is then established according to the equilibrium-conductance-compensated globally-linear function and the given reference bus serial number; thereafter, the equilibrium-conductance-compensated globally-linear eccentric matrix relation between the non-reference bus injection powers and the non-reference bus translation voltages is established by using the ordinary inversion of matrices according to the equilibrium-conductance-compensated globally-linear eccentric matrix-equation model; the equilibrium-conductance-compensated globally-linear eccentric expression of the branch-transferred power in terms of the non-reference bus injection powers is then established according to the equilibrium-conductance-compensated globally-linear eccentric matrix relation; and the power transfer coefficients of the DC power network are finally obtained according to the equilibrium-conductance-compensated globally-linear eccentric expression and the known definition of power transfer coefficient. The accuracy of the invented method is high, because the established globally-linear function that relates all bus translation voltages to a bus injection power counts the impacts of nonlinear terms of original bus injection power formula by introducing equilibrium-conductance-compensation. Resulting from its global linearity, the invented method is not only fast and reliable in obtaining a set of power transfer coefficients of an arbitrarily configurated DC power network, but also satisfies the accuracy and real-time requirement of the regulation under wide range change of the operation point of the DC power network, thereby successfully solving the problem that there is currently no globally-linear method for obtaining the power transfer coefficients of the DC power network.

BRIEF DESCRIPTION OF THE DRAWINGS

In order to explain the technical solution of the embodiments of the present application more clearly, the drawings used in the description of the embodiments will be briefly described hereinbelow. Obviously, the drawings in the following description are some embodiments of the present application, and for persons skilled in the art, other drawings may also be obtained on the basis of these drawings without any creative work.

DETAILED DESCRIPTION OF THE EMBODIMENTS

In the description hereinbelow, for purposes of explanation rather than limitation, specific details such as specific systematic architectures and techniques are set forth in order to provide a thorough understanding of the embodiments of the present application. However, it will be apparent to persons skilled in the art that the present application may also be implemented in absence of such specific details in other embodiments. In other instances, detailed descriptions of well-known systems, devices, circuits, and methods are omitted so as not to obscure the description of the present application with unnecessary detail.

Technical solution of the present application is explained hereinbelow by particular embodiments.

Figure 1:
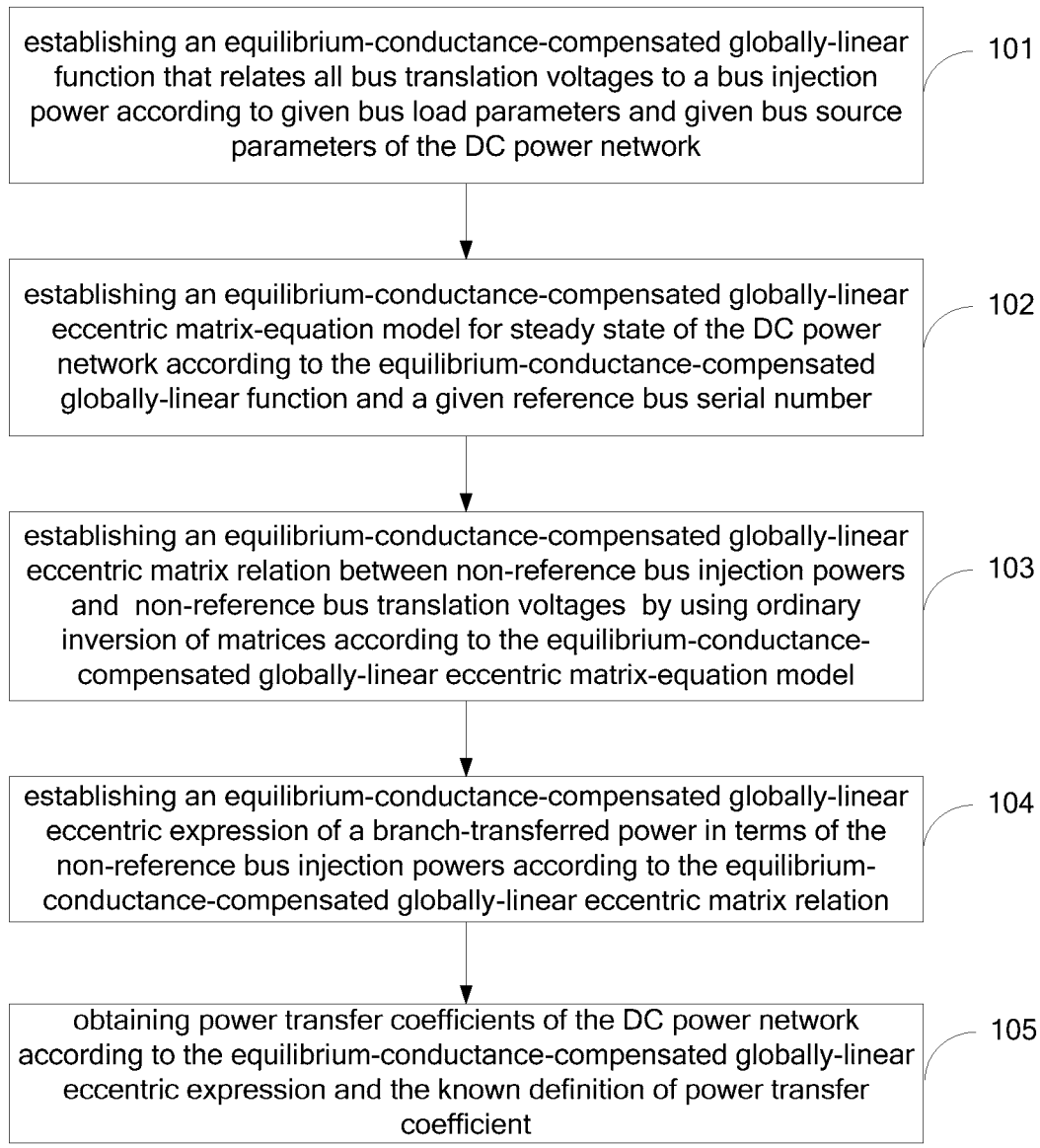
FIG. 1 is an implementation flow chart of an equilibrium-conductance-compensated eccentric method for obtaining the power transfer coefficients of the DC power network in accordance with an embodiment of the present application.
Figure 2:
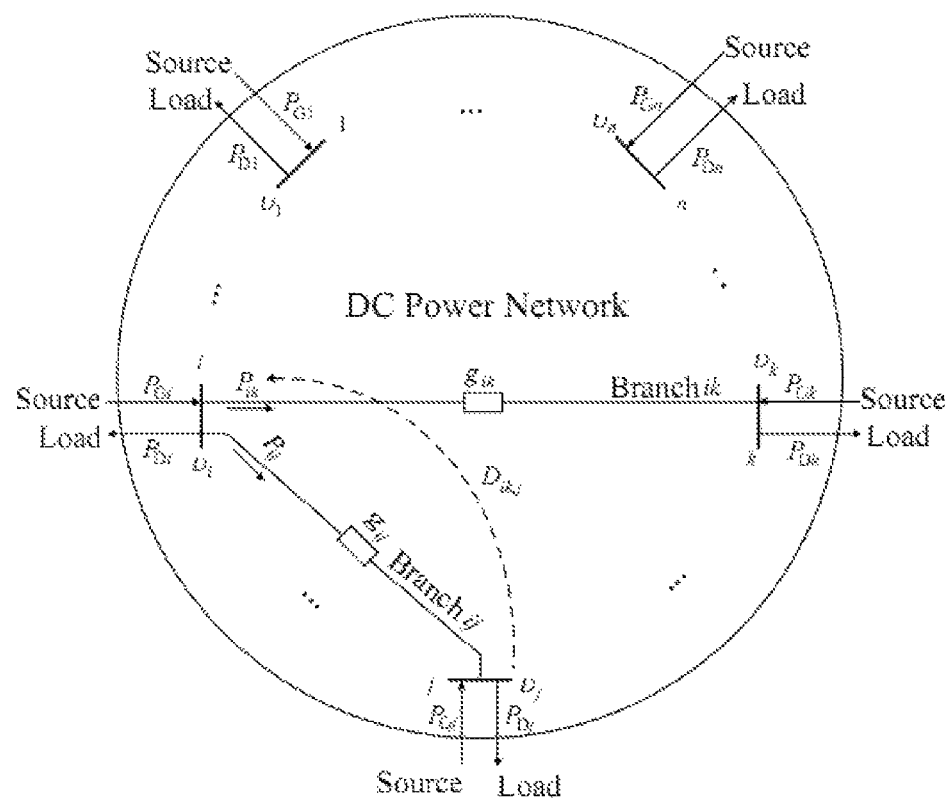
FIG. 2 is a structural schematic diagram of a universal model of a DC power network in accordance with an embodiment of the present application.

Please refer to FIG. 1, which is an implementation flow chart of an equilibrium-conductance-compensated eccentric method for obtaining power transfer coefficients of a DC power network. The equilibrium-conductance-compensated eccentric method for obtaining the power transfer coefficients of the DC power network as illustrated in the figure may be conducted according to the following steps:

In step 101: an equilibrium-conductance-compensated globally-linear function that relates all bus translation voltages to a bus injection power is established according to given bus load parameters and given bus source parameters of the DC power network.

The step 101 is specifically as follows: the equilibrium-conductance-compensated globally-linear function that relates all the bus translation voltages to the bus injection power is established according the following formula:

$$P_{Gi} - P_{Di} = \sum_{k=1, k \neq i}^{n} (\mu_{ik} g_{ik} v_i - u_{i*} g_{ik} v_k)$$

in which, both i and k denote serial numbers of buses in the DC power network and belong to the set of continuous natural numbers, namely belong to $\{1, 2, \ldots, n\}$; n denotes the total number of buses in the DC power network; $P_{Gi}$ denotes the power of the source connected to bus i; $P_{Di}$ denotes the power of the load connected to bus i; $P_{Gi} - P_{Di}$ is bus i injection power; $g_{ik}$ denotes the conductance of branch ik connected between bus i and bus k; $v_i$ denotes the translation voltage at bus i; $v_k$ denotes the translation voltage at bus k; both $v_i$ and $v_k$ are per-unit voltages translated by $-1.0$; $\mu_{ik}$ is a first DC power network parameter determined by the formula $\mu_{ik} = (1 + v_{i0} - 0.5 v_{k0})$; $\mu_{i*}$ is a second DC power network parameter determined by the formula $\mu_{i*} = (1 + 0.5 v_{i0})$; $v_{i0}$ denotes the base point translation voltage at bus i; $v_{k0}$ denotes the base point translation voltage at bus k; and both $v_{i0}$ and $v_{k0}$ are per-unit voltages translated by $-1.0$.

$P_{Gi}$, $P_{Di}$, n, $g_{ik}$, $v_{i0}$, and $v_{k0}$ are all given DC power network parameters.

The variables in the above equilibrium-conductance-compensated globally-linear function are all global variables rather than increments. In addition, coefficients $\mu_{ik} g_{ik}$ and $-\mu_{i*} g_{ik}$ of $v_i$ and $v_k$ in the above equilibrium-conductance-compensated globally-linear function are respectively self-conductance and mutual-conductance, which are respectively supplemented with the conductance term $(v_{i0} - 0.5 v_{k0}) g_{ik}$ and the conductance term $-0.5 v_{i0} g_{ik}$ compared with the traditional self-conductance and mutual-conductance. The two supplementary conductance terms, $(v_{i0} - 0.5 v_{k0}) g_{ik}$ and $-0.5 v_{i0} g_{ik}$, are respectively factors of $v_i$ and $v_k$ in the two fraction power terms produced by allocating in equilibrium way (according to Shapley value) the non-linear terms of the original bus injection power formula at the right-hand side of the above function to $v_i$ and $v_k$. They are determined at an operation base point of the DC power network, and used to compensate the impacts of nonlinear terms of original bus injection power formula. This is the reason why the above function is called the equilibrium-conductance-compensated globally-linear function.

The above equilibrium-conductance-compensated globally-linear function is established following operation characteristics of the DC power network. The operation characteristics of the DC power network is that each bus translation voltage translated by $-1.0$ is very small, so replacing the product of a branch conductance and its end bus translation voltage with a constant always causes very small impact on accuracy of power transfer coefficients.

In step 102, an equilibrium-conductance-compensated globally-linear eccentric matrix-equation model for steady state of the DC power network is established according to the equilibrium-conductance-compensated globally-linear function and a given reference bus serial number.

The step 102 is specifically as follows: the equilibrium-conductance-compensated globally-linear eccentric matrix-equation model for the steady state of the DC power network is established by the following formula:

$$\begin{bmatrix} P_{G1} - P_{D1} \\ \vdots \\ P_{Gi} - P_{Di} \\ \vdots \\ P_{Gn-1} - P_{Dn-1} \end{bmatrix} = (G_{ij}) \begin{bmatrix} v_1 \\ \vdots \\ v_i \\ \vdots \\ v_{n-1} \end{bmatrix}, G_{ij} = \begin{cases} \sum_{k=1, k \neq i}^{n} \mu_{ik} g_{ik}, & \text{if } j = i \\ -\mu_{i*} g_{ij}, & \text{if } j \neq i \end{cases}$$

in which, i, j and k denote serial numbers of buses in the DC power network and belong to the set of continuous natural numbers, namely belong to $\{1, 2, \ldots, n\}$; n denotes the total number of buses in the DC power network; $P_{G1}$ denotes the power of the source connected to bus 1; $P_{Gi}$ denotes the power of the source connected to bus i; $P_{Gn-1}$ denotes the power of the source connected to bus n-1; $P_{D1}$ denotes the power of the load connected to bus 1; $P_{Di}$ denotes the power of the load connected to bus i; $P_{Dn-1}$ denotes the power of the load connected to bus n-1; $g_{ij}$ denotes the conductance of branch ij connected between bus i and bus j; $g_{ik}$ denotes the conductance of branch ik connected between bus i and bus k; the bus numbered n is the given reference bus; $(G_{ij})$ is the equilibrium-conductance-compensated bus conductance matrix of the DC power network and does not include the row and the column corresponding to the reference bus, the dimension of the equilibrium-conductance-compensated bus conductance matrix is (n−1)×(n−1); $G_{ij}$ is the row-i and column-j element of the equilibrium-conductance-compensated bus conductance matrix ($G_{ij}$); $v_1$ denotes the translation voltage at bus 1; $v_i$ denotes the translation voltage at bus i; $v_{n-1}$ denotes the translation voltage at bus n−1; $v_1$, $v_i$ and $v_{n-1}$ are all per-unit voltages translated by −1.0; $\mu_{ik}$ is a first DC power network parameter determined by the formula $\mu_{ik}=(1+v_{i0}-0.5v_{k0})$; $\mu_{i*}$ is a second DC power network parameter determined by the formula $\mu_{i*}=(1+0.5v_{i0})$; $v_{i0}$ denotes the base point translation voltage at bus i; $v_{k0}$ denotes the base point translation voltage at bus k; and both $v_{i0}$ and $v_{k0}$ are per-unit voltages translated by −1.0.

$P_{G1}$, $P_{D1}$, $P_{Gi}$, $P_{Di}$, $P_{Gn-1}$, $P_{Dn-1}$ and ($G_{ij}$) are all given DC power network parameters.

In the above equilibrium-conductance-compensated globally-linear eccentric matrix-equation model, the translation voltage of the reference bus is specified to be zero, which means the reference bus is the center of the bus translation voltage values of the DC power network. The center of the bus translation voltage values is to the reference bus completely. This is the reason why the above matrix-equation model is called the equilibrium-conductance-compensated globally-linear eccentric matrix-equation model.

In step 103, an equilibrium-conductance-compensated globally-linear eccentric matrix relation between non-reference bus injection powers and non-reference bus translation voltages is established by using ordinary inversion of matrices according to the equilibrium-conductance-compensated globally-linear eccentric matrix-equation model.

The step 103 is specifically as follows: the equilibrium-conductance-compensated globally-linear eccentric matrix relation between the non-reference bus injection powers and the non-reference bus translation voltages is established by the following formula:

$$\begin{bmatrix} v_1 \\ \vdots \\ v_i \\ \vdots \\ v_{n-1} \end{bmatrix} = (G_{ij})^{-1} \begin{bmatrix} P_{G1} - P_{D1} \\ \vdots \\ P_{Gi} - P_{Di} \\ \vdots \\ P_{Gn-1} - P_{Dn-1} \end{bmatrix}$$

in which, i and j denote serial numbers of buses in the DC power network and belong to the set of continuous natural numbers, namely belong to $\{1, 2, \ldots, n\}$; n denotes the total number of buses in the DC power network; $(G_{ij})^{-1}$ denotes the ordinary inversion of the equilibrium-conductance-compensated bus conductance matrix ($G_{ij}$) of the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $v_1$ denotes the translation voltage at bus 1; $v_i$ denotes the translation voltage at bus i; $v_{n-1}$ denotes the translation voltage at bus n−1; and $v_1$, $v_i$ and $v_{n-1}$ are all per-unit voltages translated by −1.0.

Since the variables in the above equilibrium-conductance-compensated globally-linear eccentric matrix relation are all global variables (rather than increments), the non-reference bus translation voltages determined by this matrix relation are accurate under wide range change of the bus injection powers or wide range change of the operation point of the DC power network, and the linear feature makes the calculation fast and reliable.

In step 104, an equilibrium-conductance-compensated globally-linear eccentric expression of a branch-transferred power in terms of the non-reference bus injection powers is established according to the equilibrium-conductance-compensated globally-linear eccentric matrix relation.

The step 104 is specifically as follows: the equilibrium-conductance-compensated globally-linear eccentric expression of the branch-transferred power in terms of the non-reference bus injection powers is established by the following formula:

$$P_{ik} = g_{ik} \sum_{j=1}^{n} (\mu_{ik} a_{ij} - \mu_{i*} a_{kj})(P_{Gj} - P_{Dj})$$

in which, i, j and k denote serial numbers of buses in the DC power network and belong to the set of continuous natural numbers, namely belong to $\{1, 2, \ldots, n\}$; n denotes the total number of buses in the DC power network; $g_{ik}$ denotes the conductance of branch ik connected between bus i and bus k; $\mu_{ik}$ is a first DC power network parameter determined by the formula $\mu_{ik}=(1+v_{i0}-0.5v_{k0})$; $\mu_{i*}$ is a second DC power network parameter determined by the formula $\mu_{i*}=(1+0.5v_{i0})$; $v_{i0}$ denotes the base point translation voltage at bus i; $v_{k0}$ denotes the base point translation voltage at bus k; both $v_{i0}$ and $v_{k0}$ are per-unit voltages translated by −1.0; $P_{ik}$ denotes the power transferred by branch ik; $a_{ij}$ denotes the row-i and column-j element of the ordinary inverse matrix of the equilibrium-conductance-compensated bus conductance matrix ($G_{ij}$) of the DC power network; $a_{kj}$ denotes the row-k and column-j element of the ordinary inverse matrix of the equilibrium-conductance-compensated bus conductance matrix ($G_{ij}$) of the DC power network; $P_{Gj}$ denotes the power of the source connected to bus j; $P_{Dj}$ denotes the power of the load connected to bus j; and $P_{Gj}-P_{Dj}$ is bus j injection power.

In step 105, power transfer coefficients of the DC power network are obtained according to the equilibrium-conductance-compensated globally-linear eccentric expression and the known definition of power transfer coefficient.

The step 105 is specifically as follows: the power transfer coefficients of the DC power network are calculated by the following formula:

$$D_{ik,j} = (\mu_{ik} a_{ij} - \mu_{i*} a_{kj}) g_{ik}$$

in which, i, j and k denote serial numbers of buses in the DC power network and belong to the set of continuous natural numbers, namely belong to $\{1, 2, \ldots, n\}$; $g_{ik}$ denotes the conductance of branch ik connected between bus i and bus k; $D_{ik,j}$ denotes the power transfer coefficient from bus j to branch ik; $\mu_{ik}$ is a first DC power network parameter determined by the formula $\mu_{ik}=(1+v_{i0}-0.5v_{k0})$; $\mu_{i*}$ is a second DC power network parameter determined by the formula $\mu_{i*}=(1+0.5v_{i0})$; $v_{i0}$ denotes the base point translation voltage at bus i; $v_{k0}$ denotes the base point translation voltage at bus k; both $v_{i0}$ and $v_{k0}$ are per-unit voltages translated by −1.0; $a_{ij}$ denotes the row-i and column-j element of the ordinary inverse matrix of the equilibrium-conductance-compensated bus conductance matrix ($G_{ij}$) of the DC power network; and $a_{kj}$ denotes the row-k and column-j element of the ordinary inverse matrix of the equilibrium-conductance-compensated bus conductance matrix ($G_{ij}$) of the DC power network.

The power transfer coefficient is defined as follows: when the branch-transferred power is expressed by a linear combination of all bus injection powers, each combination coefficient is a power transfer coefficient.

For the combinations of all branches and all non-reference buses of the DC power network, all power transfer coefficients determined by the above formula form a set of power transfer coefficients of the DC power network, thereby realizing the obtaining of the power transfer coefficients of the DC power network.

The above formulas are based on the ordinary inversion of the equilibrium-conductance-compensated bus conductance matrix of the DC power network. As the ordinary inversion of this matrix exists indeed, the power transfer coefficients of the DC power network can be obtained reliably. In addition, the global linearity feature of the above expression of the branch-transferred power in terms of the non-reference bus injection powers allows the calculation of the power transfer coefficients to be accurate and fast under wide range change of the operation point of the DC power network. Consequently, the equilibrium-conductance-compensated eccentric method for obtaining the power transfer coefficients of the DC power network is accurate, fast and reliable.

It should be understood that the serial number of each step in the above embodiment doesn't mean the sequence of an execution order, the execution order of different steps should be determined according to their functions and the internal logics, and should not constitute any limitation to the implementation process of the embodiment of the present application.

It can be appreciated by persons skilled in the art that the exemplified units and algorithm steps described in combination with the embodiments of the present application can be implemented in the form of electronic hardware or in the form of a combination of computer software and the electronic hardware. Whether these functions are executed in the form of hardware or software is determined by specific application and designed constraint conditions of the technical solution. For each specific application, persons skilled in the art may use different methods to implement the described functions, but the implementation should not be considered to go beyond the scope of the present application.

What is claimed is:

1. An equilibrium-conductance-compensated eccentric method for obtaining power transfer coefficients of a direct current (DC) power network, the method comprising the following steps:
    establishing an equilibrium-conductance-compensated globally-linear function that relates all bus translation voltages to a bus injection power according to given bus load parameters and given bus source parameters of the DC power network;
    establishing an equilibrium-conductance-compensated globally-linear eccentric matrix-equation model for steady state of the DC power network according to the equilibrium-conductance-compensated globally-linear function and a given reference bus serial number;
    establishing an equilibrium-conductance-compensated globally-linear eccentric matrix relation between non-reference bus injection powers and non-reference bus translation voltages by using ordinary inversion of matrices according to the equilibrium-conductance-compensated globally-linear eccentric matrix-equation model;
    establishing an equilibrium-conductance-compensated globally-linear eccentric expression of a branch-transferred power in terms of the non-reference bus injection powers according to the equilibrium-conductance-compensated globally-linear eccentric matrix relation; and
    obtaining power transfer coefficients of the DC power network according to the equilibrium-conductance-compensated globally-linear eccentric expression and the known definition of power transfer coefficient.

2. The method of claim 1, wherein the step of establishing the equilibrium-conductance-compensated globally-linear function that relates all the bus translation voltages to the bus injection power according to the given bus load parameters and the given bus source parameters of the DC power network comprises:
    establishing the equilibrium-conductance-compensated globally-linear function that relates all the bus translation voltages to the bus injection power by the following formula:

$$P_{Gi} - P_{Di} = \sum_{k=1, k \neq i}^{n} (\mu_{ik} g_{ik} v_i - u_{i*} g_{ik} v_k)$$

wherein, both i and k denote serial numbers of buses in the DC power network and belong to the set of continuous natural numbers, namely belong to $\{1, 2, \ldots, n\}$; n denotes the total number of buses in the DC power network; $P_{Gi}$ denotes the power of the source connected to bus i; $P_{Di}$ denotes the power of the load connected to bus i; $P_{Gi} - P_{Di}$ is bus i injection power; $g_{ik}$ denotes the conductance of branch ik connected between bus i and bus k; $v_i$ denotes the translation voltage at bus i; $v_k$ denotes the translation voltage at bus k; both $v_i$ and $v_k$ are per-unit voltages translated by $-1.0$; $\mu_{ik}$ is a first DC power network parameter determined by the formula $\mu_{ik} = (1 + v_{i0} - 0.5 v_{k0})$; $\mu_{i*}$ is a second DC power network parameter determined by the formula $\mu_{i*} = (1 + 0.5 v_{i0})$; $v_{i0}$ denotes the base point translation voltage at bus i; $v_{k0}$ denotes the base point translation voltage at bus k; and both $v_{i0}$ and $v_{k0}$ are per-unit voltages translated by $-1.0$.

3. The method of claim 1, wherein the step of establishing the equilibrium-conductance-compensated globally-linear eccentric matrix-equation model for the steady state of the DC power network according to the equilibrium-conductance-compensated globally-linear function and the given reference bus serial number comprises:
    establishing the equilibrium-conductance-compensated globally-linear eccentric matrix-equation model for the steady state of the DC power network by the following formula:

$$\begin{bmatrix} P_{G1} - P_{D1} \\ \vdots \\ P_{Gi} - P_{Di} \\ \vdots \\ P_{Gn-1} - P_{Dn-1} \end{bmatrix} = (G_{ij}) \begin{bmatrix} v_1 \\ \vdots \\ v_i \\ \vdots \\ v_{n-1} \end{bmatrix}, G_{ij} = \begin{cases} \sum_{k=1, k \neq i}^{n} \mu_{ik} g_{ik}, & \text{if } j = i \\ -\mu_{i*} g_{ij}, & \text{if } j \neq i \end{cases}$$

wherein, i, j and k denote serial numbers of buses in the DC power network and belong to the set of continuous natural numbers, namely belong to $\{1, 2, \ldots, n\}$; n denotes the total number of buses in the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $g_{ij}$ denotes the conductance of branch ij connected between bus i and bus j; $g_{ik}$ denotes the conductance of branch ik connected between bus i and bus k; the bus numbered n is the given reference bus; ($G_{ij}$) is the equilibrium-conductance-compensated bus conductance matrix of the DC power network and does not include the row and the column corresponding to the reference bus, the dimension of the equilibrium-conductance-compensated bus conductance matrix is (n−1)×(n−1); $G_{ij}$ is the row-i and column-j element of the equilibrium-conductance-compensated bus conductance matrix ($G_{ij}$); $v_1$ denotes the translation voltage at bus 1; $v_i$ denotes the translation voltage at bus i; $v_{n-1}$ denotes the translation voltage at bus n−1; $v_1$, $v_i$ and $v_{n-1}$ are all per-unit voltages translated by −1.0; $\mu_{ik}$ is a first DC power network parameter determined by the formula $\mu_{ik}=(1+v_{i0}-0.5v_{k0})$; $\mu_{i*}$ is a second DC power network parameter determined by the formula $\mu_{i*}=(1+0.5v_{i0})$; $v_{i0}$ denotes the base point translation voltage at bus i; $v_{k0}$ denotes the base point translation voltage at bus k; and both $v_{i0}$ and $v_{k0}$ are per-unit voltages translated by −1.0.

4. The method of claim 1, wherein the step of establishing the equilibrium-conductance-compensated globally-linear eccentric matrix relation between the non-reference bus injection powers and the non-reference bus translation voltages by using the ordinary inversion of matrices according to the equilibrium-conductance-compensated globally-linear eccentric matrix-equation model comprises:
establishing the equilibrium-conductance-compensated globally-linear eccentric matrix relation between the non-reference bus injection powers and the non-reference bus translation voltages by the following formula:

$$\begin{bmatrix} v_1 \\ \vdots \\ v_i \\ \vdots \\ v_{n-1} \end{bmatrix} = (G_{ij})^{-1} \begin{bmatrix} P_{G1}-P_{D1} \\ \vdots \\ P_{Gi}-P_{Di} \\ \vdots \\ P_{Gn-1}-P_{Dn-1} \end{bmatrix}$$

wherein, i and j denote serial numbers of buses in the DC power network and belong to the set of continuous natural numbers, namely belong to $\{1, 2, \ldots, n\}$; n denotes the total number of buses in the DC power network; $(G_{ij})^{-1}$ denotes the ordinary inversion of the equilibrium-conductance-compensated bus conductance matrix ($G_{ij}$) of the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $v_1$ denotes the translation voltage at bus 1; $v_i$ denotes the translation voltage at bus i; $v_{n-1}$ denotes the translation voltage at bus n−1; and $v_1$, $v_i$ and $v_{n-1}$ are all per-unit voltages translated by −1.0.

5. The method of claim 1, wherein the step of establishing the equilibrium-conductance-compensated globally-linear eccentric expression of the branch-transferred power in terms of the non-reference bus injection powers according to the equilibrium-conductance-compensated globally-linear eccentric matrix relation comprises:
establishing the equilibrium-conductance-compensated globally-linear eccentric expression of the branch-transferred power in terms of the non-reference bus injection powers by the following formula:

$$P_{ik} = g_{ik} \sum_{j=1}^{n} (\mu_{ik}a_{ij} - \mu_{i*}a_{kj})(P_{Gj}-P_{Dj})$$

wherein, i, j and k denote serial numbers of buses in the DC power network and belong to the set of continuous natural numbers, namely belong to $\{1, 2, \ldots, n\}$; n denotes the total number of buses in the DC power network; $g_{ik}$ denotes the conductance of branch ik connected between bus i and bus k; $\mu_{ik}$ is a first DC power network parameter determined by the formula $\mu_{ik}=(1+v_{i0}-0.5v_{k0})$; $\mu_{i*}$ is a second DC power network parameter determined by the formula $\mu_{i*}=(1+0.5v_{i0})$; $v_{i0}$ denotes the base point translation voltage at bus i; $v_{k0}$ denotes the base point translation voltage at bus k; both $v_{i0}$ and $v_{k0}$ are per-unit voltages translated by −1.0; $P_{ik}$ denotes the power transferred by branch ik; $a_{ij}$ denotes the row-i and column-j element of the ordinary inverse matrix of the equilibrium-conductance-compensated bus conductance matrix ($G_{ij}$) of the DC power network; $a_{kj}$ denotes the row-k and column-j element of the ordinary inverse matrix of the equilibrium-conductance-compensated bus conductance matrix ($G_{ij}$) of the DC power network; $P_{Gj}$ denotes the power of the source connected to bus j; $P_{Dj}$ denotes the power of the load connected to bus j; and $P_{Gj}-P_{Dj}$ is bus j injection power.

6. The method of claim 1, wherein the step of obtaining the power transfer coefficients of the DC power network according to the equilibrium-conductance-compensated globally-linear eccentric expression and the known definition of power transfer coefficient comprises:
calculating the power transfer coefficients of the DC power network by the following formula:

$$D_{ik,j} = (\mu_{ik}a_{ik} - \mu_{i*}a_{kj})g_{ik}$$

wherein, i, j and k denote serial numbers of buses in the DC power network and belong to the set of continuous natural numbers, namely belong to $\{1, 2, \ldots, n\}$; $g_{ik}$ denotes the conductance of branch ik connected between bus i and bus k; $D_{ik,j}$ denotes the power transfer coefficient from bus j to branch ik; $\mu_{ik}$ is a first DC power network parameter determined by the formula $\mu_{ik}=(1+v_{i0}-0.5v_{k0})$; $\mu_{i*}$ is a second DC power network parameter determined by the formula $\mu_{i*}=(1+0.5v_{i0})$; $v_{i0}$ denotes the base point translation voltage at bus i; $v_{k0}$ denotes the base point translation voltage at bus k; both $v_{i0}$ and $v_{k0}$ are per-unit voltages translated by −1.0; $a_{ij}$ denotes the row-i and column-j element of the ordinary inverse matrix of the equilibrium-conductance-compensated bus conductance matrix ($G_{ij}$) of the DC power network; and $a_{kj}$ denotes the row-k and column-j element of the ordinary inverse matrix of the equilibrium-conductance-compensated bus conductance matrix ($G_{ij}$) of the DC power network.

* * * * *